June 10, 1969     R. A. CLOSE     3,448,482
WIPER ARM CARRIED WATER NOZZLE
Filed June 16, 1967     Sheet _1_ of 2
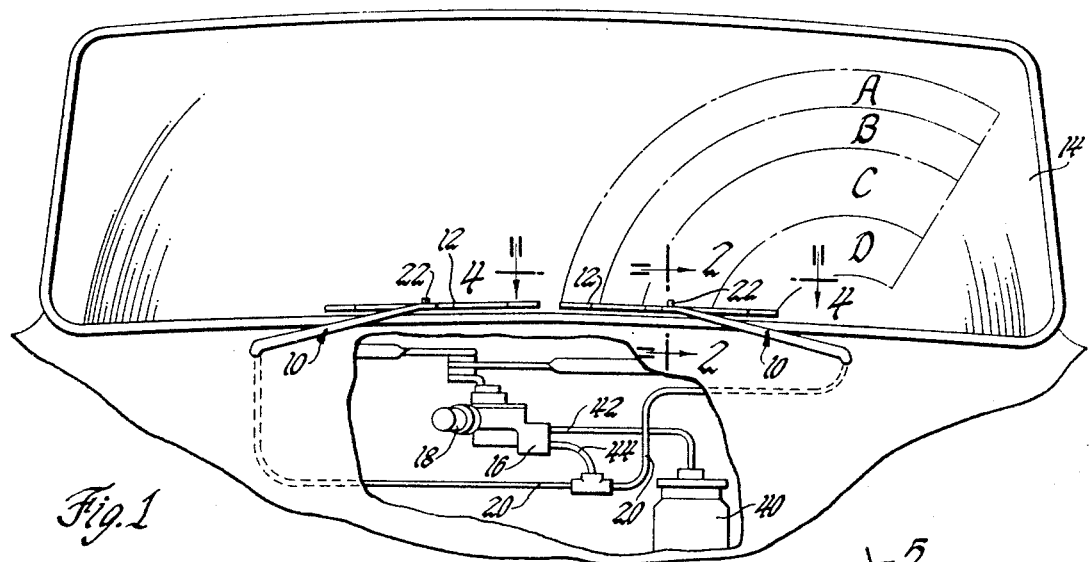
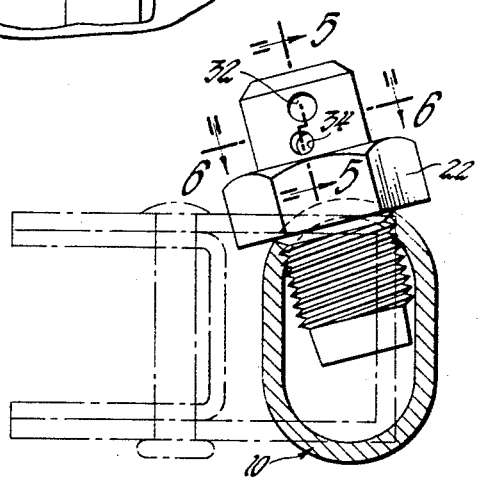
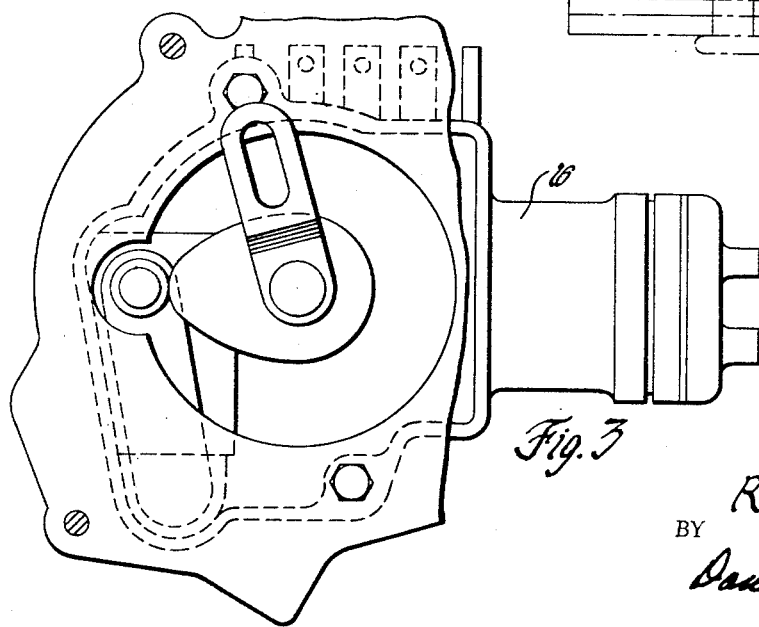
INVENTOR
Robert A. Close
BY
Donald P. Selucki
ATTORNEY

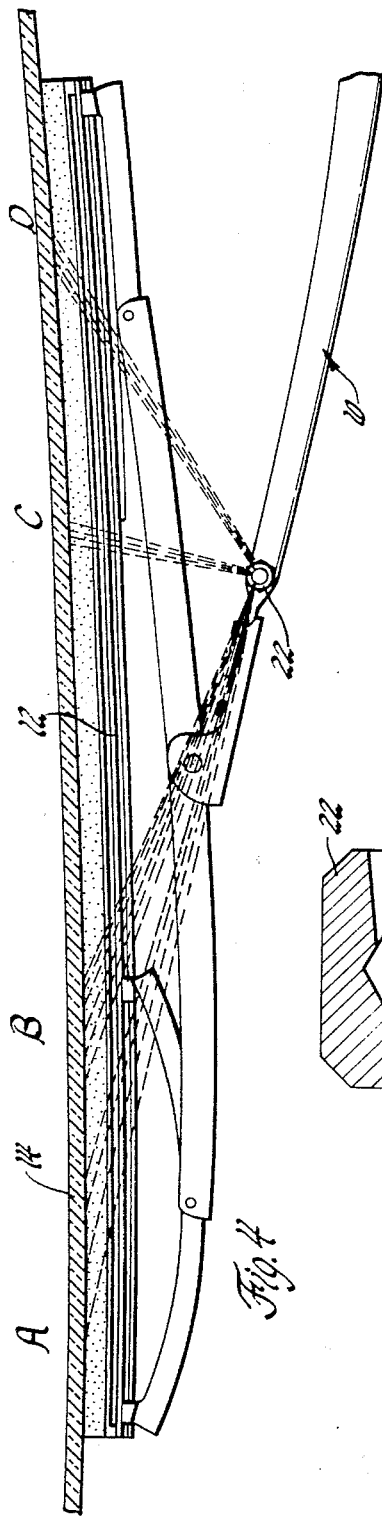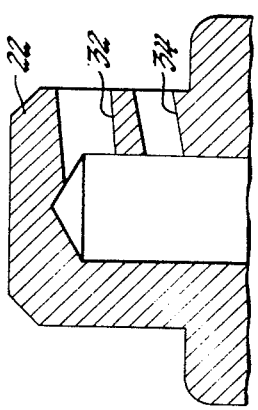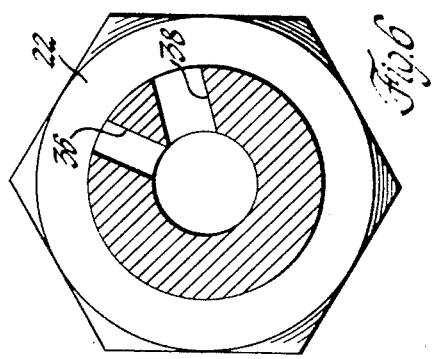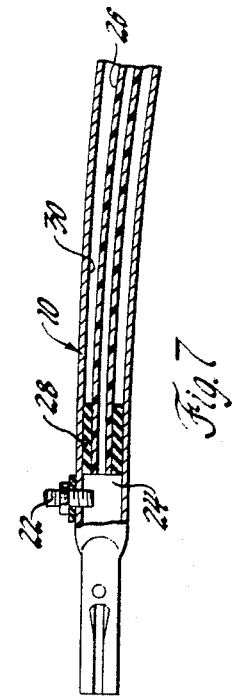

United States Patent Office 3,448,482
Patented June 10, 1969

3,448,482
WIPER ARM CARRIED WATER NOZZLE
Robert A. Close, Rochester, N.Y., assignor to General Motors Corporation, Detroit, Mich., a corporation of Delaware
Filed June 16, 1967, Ser. No. 646,670
Int. Cl. A47l 1/02; B60s 1/04
U.S. Cl. 15—250.04                  3 Claims

ABSTRACT OF THE DISCLOSURE

In a preferred form, this disclosure covers a particular type of windshield washer in which the area on a windshield which the wiper covers during a wiping cycle is broken down into substantially equal zones and a fluid dispensing nozzle is provided on the wiper arm near the windshield which dispenses in a directional manner an appropriate amount of fluid to each one of the zones.

---

This invention relates to windshield cleaning mechanism and more particularly to a multiapertured fluid nozzle carried by a wiper arm for selectively dispensing fluid to predetermined zones in a wipe pattern.

Windshield washing mechanisms of common design provide a high pressure stream of washing fluid aimed at a point in front of the advancing wiper blade which wipes a predetermined area of the windshield. The wiper blade normally wipes an area substantially equal to a quadrant of a circle. It is obvious that the portion of the blade reaching the circumference of the circle travels a greater distance and wipes a larger area than portions of the wiper blade nearer the pivot point. In order to provide the proper amount of fluid for washing purposes, it is obvious that more fluid is needed near the end of the wiper blade forming the periphery of the wipe pattern than near the nearest to the wiper arm pivot. It is also important that a stream of washing fluid be provided rather than a spray due to the wind effect on the dispensed fluid on the vehicle windshield when the vehicle is in motion.

An ideal fluid dispensing system provides more washing fluid near the circumference of the circle of which the wipe pattern is a quadrant. It is also obvious that a greater area exists for wiping toward the circumference of the aforementioned circle outboard of the center point of the wiper blade. Washer nozzles found in the prior art attempt to direct a stream of fluid at a point on the windshield near the circumference of the wipe pattern and near the portion nearest the wiper arm pivot. This necessarily results in less washing fluid being provided near the middle of the windshield where cleaning is most necessary. At the same time, one or more streams of fluid provided by nozzles found in the prior art merely improve the washing but do not solve the distribution problem.

It is an object of the present invention to provide an improved washer nozzle mounted on the wiper arm at a point proximate the windshield.

It is another object of the present invention to provide an improved washer nozzle having a multitude of varied dimensioned apertures adapted to direct fluid angularly and with a quantity proportional to the area on the wipe pattern requiring a predetermined amount of fluid for the complete cleaning thereof.

It is still another object of the present invention to utilize the wiper arm itself as a primed fluid conduit for washing fluid from a pressure source to the point where the fluid is dispensed near the glass.

It is a further object of the present invention to provide an improved washer nozzle which is readily adaptable for use with windshield washing systems in common usage.

Further objects and advantages of the present invention will be apparent from the following description, reference being had to the accompanying drawings wherein a preferred embodiment of the present invention is clearly shown.

In the drawings:

FIGURE 1 is a diagrammatic illustration of a wiper and washer system in accordance with the present invention with the different zonal areas partitioned on the windshield;

FIGURE 2 is a sectional view taken along line 2—2 of FIGURE 1;

FIGURE 3 illustrates a washer pump with parts broken away;

FIGURE 4 is a sectional view of the windshield taken along line 4—4 of FIGURE 1;

FIGURE 5 is a sectional view taken along line 5—5 of FIGURE 2;

FIGURE 6 is a sectional view taken along line 6—6 of FIGURE 2;

FIGURE 7 is a sectional view of the wiper arm used in accordance with the present invention showing the interior fluid conduit and well beneath the washer nozzle.

Referring to FIGURE 1, wiper arms 10 with attached blades 12 wipe a pattern on windshield 14 substantially in the shape illustrated. The wipe pattern on windshield 14 is broken down into zones A, B, C, and D of substantially the same area.

Windshield wiper pump 16 responds to movement of motor 18 to provide fluid under pressure through lines 20 to nozzles 22. It is understood that both windshield wipers shown in FIGURE 1 wipe a pattern that is a mirror image of the other on opposite sides of the windshield. The washer pump 16 is clearly shown in FIGURE 3 and is substantially the same type illustrated in United States Patent 2,936,476, assigned to the assignee of the same invention.

Referring to FIGURE 2, wiper arm 10 is shown in section with nozzle 22 threaded thereinto. Arm 10 is more clearly shown in FIGURE 7 with nozzle 22 threaded through one wall of arm 10 into a well area 24. A tube 26 extends to the center of wiper arm 12 terminating at one end in well 24 and at the opposite end in line 20. Tube 26 and line 20 in a given installation could be the same physical tube or could be separate as the designer of the system desired. Tube 20 is operably positioned by locating seal member 28 which is a substantially tubular member having tube 26 resiliently held in the center thereof while the periphery of the seal 28 resiliently engages an interior wall portion 30 of arm 10.

Referring to FIGURE 5, nozzle 22 is illustrated as having an aperture 32 and an aperture 34 formed in a wall thereof providing a path for fluid communication from well 24 through the center of nozzle 22 to the exterior of nozzle 22. In the example shown, apertures 32 and 34 are designed to present a stream of fluid to zones A and B respectively of the wipe pattern shown in FIGURE 1. It is noted that aperture 32 is larger than aperture 34 to accommodate the greater quantity of fluid required to be directed toward zone A than zone B because of overspray likelihood and also because of the wind effect likely to be experienced during vehicle motion.

Referring to FIGURE 6, apertures 36 and 38 are provided to provide a fluid stream in zones C and D, respectively, on the wipe pattern illustrated in FIGURE 1. Again aperture 38 is larger than aperture 36 in order to accommodate the expected overspray waste as well as the fluid loss due to wind effect likely to be experienced during vehicle motion. The wind effect loss is brought about because of the greater distance of zone D than zone C from the dispersal point of the fluid.

Referring to FIGURE 4, a fluid stream is shown emanating from each of the apertures in nozzle 2, previously described, and it becomes apparent that the fluid streams are directed to areas of the windshield corresponding to the center of zones A, B, C and D. In addition, FIGURE 5 illustrates nozzles 32 and 34 as not only being of different dimension but being angularly cut to provide a greater elevation of discharge than provided with apertures 36 and 38. This, of course, is due to the greater distance the streams emanating from apertures 32 and 34 must traverse before making contact in their target areas.

In operation, wiper motor 18 and pump 16 work conjointly in the manner described in the aforementioned Patent 2,936,476. Pump 16 is timed in a manner described therein to provide a pumping stroke at a point in the wipe pattern which places fluid on windshield 14 ahead of an advancing wiper blade. Preferably, this fluid stream is positioned in front of the wiper blade when it is at a low point in its sweep substantially as illustrated in FIGURE 1. The dispensed fluid is therefore driven across windshield 14 ahead of blade 12 to provide the efficient cleaning of the windshield. Fluid is drawn into pump 16 from reservoir 40 through line 42 and ejected through line 44 into line 20. In the preferred arrangement, lines 44, lines 20, tube 26 and well 24 are primed with washer fluid. Therefore any pulse from pump 16 is instantaneously converted into a stream from apertures 32, 34, 36, 38. These pulses will continue for a predetermined period as set forth in Patent 2,936,476 and then will terminate when sufficient fluid has been dispensed to clean windshield 14. In this manner, fluid is more efficiently dispensed, resulting in a conservation of fluid and a minimum of overspray. The location of the wiper nozzle on the wiper arms provides the source of the washing fluid with a starting point very near the windshield to be cleaned, resulting in a minimum of interference of driver vision.

While the embodiment of the present invention, as herein disclosed, constitutes a preferred form, it is to be understood that other forms might be adopted.

What is claimed is:

1. A windshield cleaning mechanism for cleaning a windshield of an automotive vehicle comprising: a windshield wiper which is oscillatable through an arcuate path across the outer surface of the windshield to wipe the same; a washer nozzle means mounted on said wiper and movable therewith as the wiper is moved through its arcuate path, said washer nozzle means having a plurality of spaced outlet apertures for emitting the washing fluid in jet form toward the windshield, said outlet apertures being of different sizes and angularly related with respect to each other and said wiper so that different quantities of washing fluid are directed toward different radially spaced, arcuately extending zones of the windshield traversed by said wiper; and means for supplying washing fluid under pressure to said washer nozzle means.

2. In an automotive vehicle having a windshield, a windshield cleaning mechanism for cleaning said windshield, said windshield cleaning mechanism comprising a windshield wiper including a wiper arm which is adapted to be connected to an oscillatable drive pivot and a wiper blade carried by said wiper arm, said wiper being oscillatable through an arcuate path across the outer surface of said windshield to wipe the same, a washer nozzle means mounted on the other end of said wiper arm and movable therewith as the wiper is moved through its arcuate path, means including a tube carried by the wiper arm for supplying washing fluid under pressure to said nozzle means, said nozzle means having an inlet opening extending transversely of said wiper arm and a plurality of spaced outlet apertures extending transversely of said inlet opening for emitting washing fluid in jet form toward the windshield, said outlet apertures being of different sizes and angularly related with respect to each other and said wiper arm so that different quantities of washing fluid are directed to different radially spaced, arcuately extending zones of the windshield traversed by the wiper blade, said washer nozzle means being disposed on said wiper arm so that all of said outlet apertures direct the washing fluid away from one side of the wiper blade.

3. In an automotive vehicle as defined in claim 2 wherein said wiper arm is hollow and said tube extends through the wiper arm and wherein said nozzle means is threadably connected to said wiper arm so that it can be adjustably positioned relative to said wiper arm.

References Cited

UNITED STATES PATENTS

| | | | |
|---|---|---|---|
| 1,335,267 | 3/1920 | Ambrose et al. | 239—561 XR |
| 2,367,426 | 1/1945 | Patterson | 15—250.1 XR |
| 2,748,416 | 6/1956 | Benoit | 15—250.04 |
| 2,866,996 | 1/1959 | Krusche | 15—250.04 |
| 3,149,361 | 9/1964 | Ziegler | 15—250.04 XR |

FOREIGN PATENTS

| | | |
|---|---|---|
| 1,307,974 | 9/1962 | France. |

PETER FELDMAN, *Primary Examiner.*

U.S. Cl. X.R.

239—561